(12) United States Patent
Xiao et al.

(10) Patent No.: US 10,816,860 B2
(45) Date of Patent: Oct. 27, 2020

(54) NON-RECTANGULAR DISPLAY PANEL AND LIQUID CRYSTAL DISPLAY DEVICE

(71) Applicant: Wuhan China Star Optoelectronics Technology Co., Ltd., Wuhan (CN)

(72) Inventors: Shidi Xiao, Wuhan (CN); Qiang Gong, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/470,553

(22) PCT Filed: Jan. 4, 2019

(86) PCT No.: PCT/CN2019/070347
§ 371 (c)(1),
(2) Date: Jun. 18, 2019

(87) PCT Pub. No.: WO2020/019680
PCT Pub. Date: Jan. 30, 2020

(65) Prior Publication Data
US 2020/0192166 A1 Jun. 18, 2020

(30) Foreign Application Priority Data
Jul. 25, 2018 (CN) .......................... 2018 1 0827924

(51) Int. Cl.
*G02F 1/1343* (2006.01)
*G02F 1/1333* (2006.01)

(52) U.S. Cl.
CPC .............. *G02F 1/134309* (2013.01); *G02F 2001/133388* (2013.01); *G02F 2001/134345* (2013.01); *G02F 2201/123* (2013.01); *G02F 2201/56* (2013.01)

(58) Field of Classification Search
None
See application file for complete search history.

(56) References Cited

U.S. PATENT DOCUMENTS

| | | | |
|---|---|---|---|
| 6,348,958 B1 * | 2/2002 | Matsuoka | G02F 1/133514 349/106 |
| 7,453,534 B2 * | 11/2008 | Bang | G02F 1/1362 349/110 |
| 2011/0134383 A1 * | 6/2011 | Okada | G02F 1/134336 349/143 |

(Continued)

FOREIGN PATENT DOCUMENTS

| CN | 107167957 | 9/2017 |
|---|---|---|
| CN | 107329337 | 11/2017 |

(Continued)

*Primary Examiner* — Ryan Crockett

(57) ABSTRACT

A non-rectangular display panel and a liquid crystal display device are provided. The liquid crystal display device includes the non-rectangular display panel, and the non-rectangular display panel includes a plurality of pixels having a first pixel formed with a first pixel electrode and a second pixel formed with a second pixel electrode; an effective display area within which the first pixel is distributed; and an effective display area boundary which is located outside the effective display area and is non-rectangular. The second pixel is distributed on the effective display area boundary; and a width of the first pixel electrode is less than a width of the second pixel electrode.

10 Claims, 4 Drawing Sheets

(56) References Cited

U.S. PATENT DOCUMENTS

| | | | | |
|---|---|---|---|---|
| 2012/0086878 | A1* | 4/2012 | Mochiku | G02F 1/1339 349/5 |
| 2012/0133879 | A1* | 5/2012 | Hosokawa | G02F 1/134309 349/143 |
| 2013/0155357 | A1* | 6/2013 | Ota | G02F 1/133512 349/110 |
| 2016/0120005 | A1* | 4/2016 | Wu | H05B 33/145 313/505 |
| 2016/0291376 | A1* | 10/2016 | Iwatsu | G02F 1/133512 |
| 2017/0124966 | A1* | 5/2017 | Yamada | G09G 3/3677 |
| 2018/0149932 | A1* | 5/2018 | Nakamura | G02F 1/133512 |
| 2018/0307044 | A1* | 10/2018 | Oh | G02B 27/0176 |
| 2019/0011786 | A1 | 1/2019 | Liu et al. | |
| 2019/0198581 | A1* | 6/2019 | Kim | H01L 51/0096 |
| 2019/0265824 | A1* | 8/2019 | Abe | G06F 3/0416 |
| 2020/0241355 | A1* | 7/2020 | Chang | G02F 1/133514 |

FOREIGN PATENT DOCUMENTS

| | | |
|---|---|---|
| CN | 107479269 | 12/2017 |
| CN | 107843998 | 3/2018 |
| CN | 107945667 | 4/2018 |
| JP | 2018-063348 | 4/2018 |

* cited by examiner

NON-RECTANGULAR DISPLAY PANEL AND LIQUID CRYSTAL DISPLAY DEVICE

RELATED APPLICATIONS

This application is a National Phase of PCT Patent Application No. PCT/CN2019/070347 having International filing date of Jan. 4, 2019, which claims the benefit of priority of Chinese Patent Application No. 201810827924.7 filed on Jul. 25, 2018. The contents of the above applications are all incorporated by reference as if fully set forth herein in their entirety.

FIELD AND BACKGROUND OF THE INVENTION

The present disclosure is related to a non-rectangular display panel and a liquid crystal display device thereof, and in particular to a non-rectangular display panel with pixel electrodes of different widths and a liquid crystal display device thereof.

With increasing types of non-rectangular display panels, an effective display area boundary thereof tends to have irregular shapes, for example, non-rectangular shapes, such as a ring, a diamond or a circle, etc. Pixels in the effective display area boundary and the effective display area boundary have different levels of overlap. If this part of the pixel is occluded completely according to the effective display area boundary, a difference of an overlapping area between each sub-pixel and an effective display area will lead to color casting. On the contrary, if the pixels on the effective display area boundary are not occluded, presence of a stepped shape around the effective display area will lead to a jagged sensation.

Therefore, it is necessary to provide a non-rectangular display panel and a liquid crystal display, which can improve a structure of the non-rectangular display panel to solve the problems existing in the prior art.

SUMMARY OF THE INVENTION

The main purpose of the present disclosure is to provide a non-rectangular display panel and a liquid crystal display device with the non-rectangular display panel. The non-rectangular display panel includes two kinds of pixel electrodes with different widths or spacing, and a brightness of the pixels on the effective display area boundary is adjustable, so as to reduce the jagged sensation of the display area boundary and thereby increase the display quality.

In order to achieve the above purpose, an embodiment of the present disclosure provides a non-rectangular display panel. The non-rectangular display panel includes: a plurality of pixels including a first pixel and a second pixel, wherein the first pixel has at least three first sub-pixels, the second pixel has at least three second sub-pixels, the first pixel has a first pixel electrode, and the second pixel has a second pixel electrode; an effective display area within which the first pixel is distributed; and an effective display area boundary which is located outside the effective display area and is non-rectangular, wherein the second pixel is distributed on the effective display area boundary; wherein a width of the first pixel electrode is less than a width of the second electrode.

In an embodiment of the present disclosure, the first pixel electrode includes at least three first sub-pixel electrodes, and a first distance between two of the first sub-pixel electrodes adjacent to each other is same.

In an embodiment of the present disclosure, the second pixel electrode includes at least three second sub-pixel electrodes, and a second distance between two of the second sub-pixel electrodes adjacent to each other is same.

In an embodiment of the present disclosure, the first pixel electrode includes at least three first sub-pixel electrodes, the second pixel electrode includes at least three second sub-pixel electrodes, wherein a first distance between two of the first sub-pixel electrodes adjacent to each other is greater than a second distance between two of the second sub-pixel electrodes adjacent to each other.

A non-rectangular display panel is provided according to an embodiment of the present disclosure. The non-rectangular display panel includes: a plurality of pixels including a first pixel and a second pixel, wherein the first pixel has a first pixel electrode, and the second pixel has a second pixel electrode; an effective display area within which the first pixel is distributed; and an effective display area boundary which is located outside the effective display area and is non-rectangular, wherein the second pixel is distributed on the effective display area boundary; wherein a width of the first pixel electrode is less than a width of the second electrode.

In an embodiment of the present disclosure, the first pixel includes at least three first sub-pixels, and the second pixel includes at least three second sub-pixels.

In an embodiment of the present disclosure, the first pixel electrode includes at least three first sub-pixel electrodes, and a first distance between two of the first sub-pixel electrodes adjacent to each other is same.

In an embodiment of the present disclosure, the second pixel electrode includes at least three second sub-pixel electrodes, and a second distance between two of the second sub-pixel electrodes adjacent to each other is same.

In an embodiment of the present disclosure, the first pixel electrode includes at least three first sub-pixel electrodes, the second pixel electrode includes at least three second sub-pixel electrodes, wherein a first distance between two of the first sub-pixel electrodes adjacent to each other is greater than a second distance between two of the second sub-pixel electrodes adjacent to each other.

According to another embodiment of the present disclosure, a liquid crystal display device is provided. The liquid crystal display device includes a non-rectangular display panel, wherein the non-rectangular display panel includes: a plurality of pixels including a first pixel and a second pixel, wherein the first pixel has a first pixel electrode, and the second pixel has a second pixel electrode; an effective display area within which the first pixel is distributed; and an effective display area boundary which is located outside the effective display area and is non-rectangular, wherein the second pixel is distributed on the effective display area boundary; wherein a width of the first pixel electrode is less than a width of the second electrode.

In an embodiment of the present disclosure, the first pixel includes at least three first sub-pixels, and the second pixel includes at least three second sub-pixels.

In an embodiment of the present disclosure, the first pixel electrode includes at least three first sub-pixel electrodes, and a first distance between two of the first sub-pixel electrodes adjacent to each other is same.

In an embodiment of the present disclosure, the second pixel electrode includes at least three second sub-pixel electrodes, and a second distance between two of the second sub-pixel electrodes adjacent to each other is same.

In an embodiment of the present disclosure, the first pixel electrode includes at least three first sub-pixel electrodes, the second pixel electrode includes at least three the second sub-pixel electrodes, wherein a first distance between two of the first sub-pixel electrodes adjacent to each other is greater than a second distance between two of the second sub-pixel electrodes adjacent to each other.

A non-rectangular display panel is provided by the present disclosure. The non-rectangular display panel includes two kinds of pixel electrodes with different widths or spacing, and a brightness of the pixels on the effective display area boundary can be adjusted, so as to reduce the jagged sensation of the display area boundary and thereby increase the display quality.

DESCRIPTION OF SPECIFIC EMBODIMENTS OF THE INVENTION

The following description of each embodiment refers to the additional drawings, in order to illustrate the specific embodiments that may be implemented by the present disclosure. The directional terms mentioned in this invention, such as [upper], [lower], [front], [post], [left], [right], [inside], [outside], [side], etc., are only refers to the direction of the additional drawings. Therefore, the terms are used to illustrate and understand the present invention, not to limit the present invention.

Figure 1:
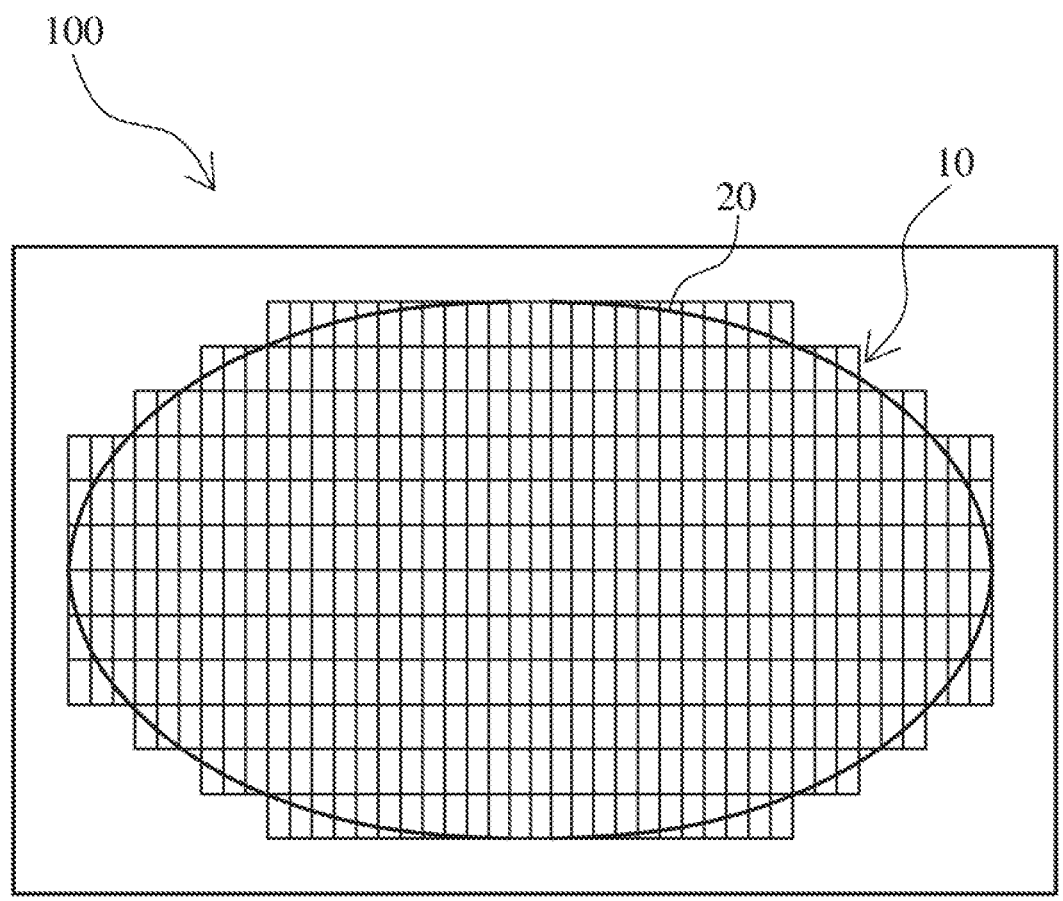
FIG. 1 is a schematic view of an appearance of a non-rectangular display panel according to an embodiment of the present disclosure.

With reference to FIG. 1, a schematic view of a non-rectangular display panel 100 according to an embodiment of the present disclosure is disclosed. The non-rectangular display panel 100 includes an effective display area 10, an effective display area boundary 20, and a plurality of pixels 30. The effective display area 10 is disposed inside the effective display area boundary 20, that is, the effective display area boundary 20 is located outside with respect to the effective display area 10. The shape of the effective display area boundary is non-rectangular, such as a ring, a diamond, a circle, a hexagon, an octagon or an irregular polygon, but is not limited thereto. The effective display area boundary 20 can be shaped according to special needs, for example, a modification is made at four corners of the non-rectangular display panel 100, so as to match design requirements of the non-rectangular display panel 100. In an embodiment of the present disclosure, the non-rectangular display panel 100 can be used in a liquid crystal display device.

Figure 2:
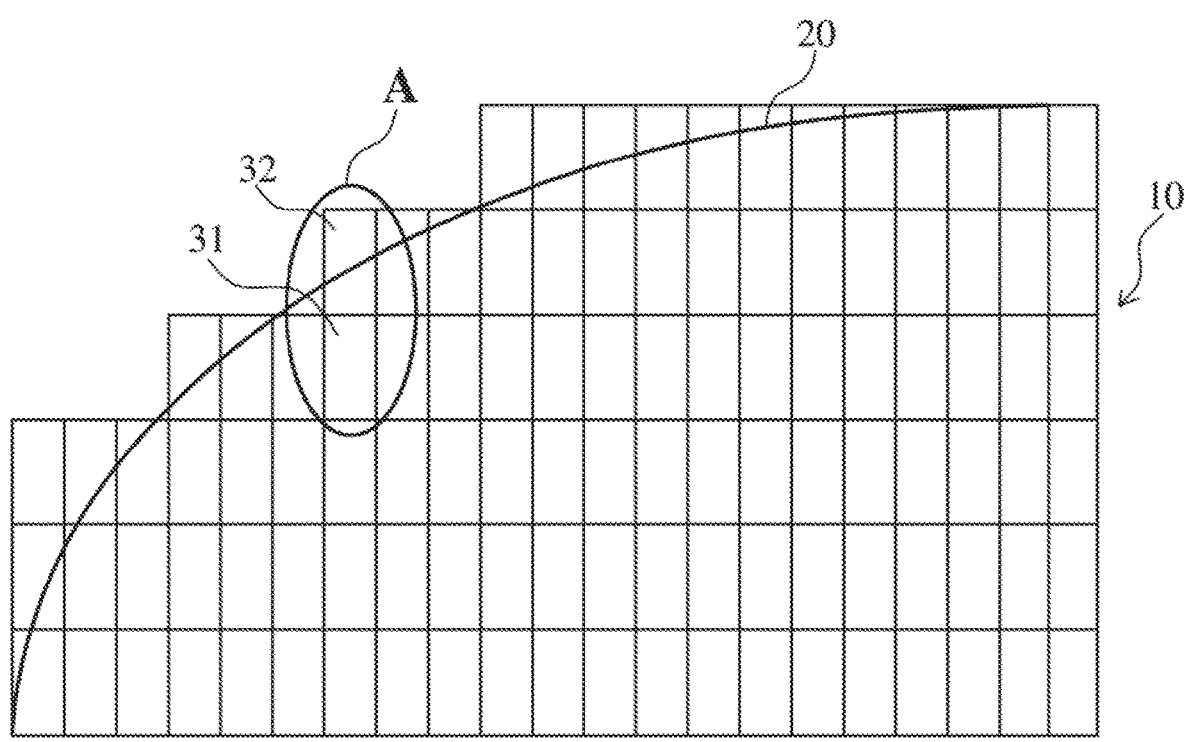
FIG. 2 is a partial enlarged view of the non-rectangular display panel according to the embodiment of the present disclosure.

With reference to FIG. 2, the plurality of pixels 30 includes a first pixel 31 and a second pixel 32. The first pixel 31 is distributed in the effective display area 10. The effective display area boundary 20 is through all the second pixel 32, that is, all the second pixel 32 is distributed on the effective display boundary 20.

Figure 3:
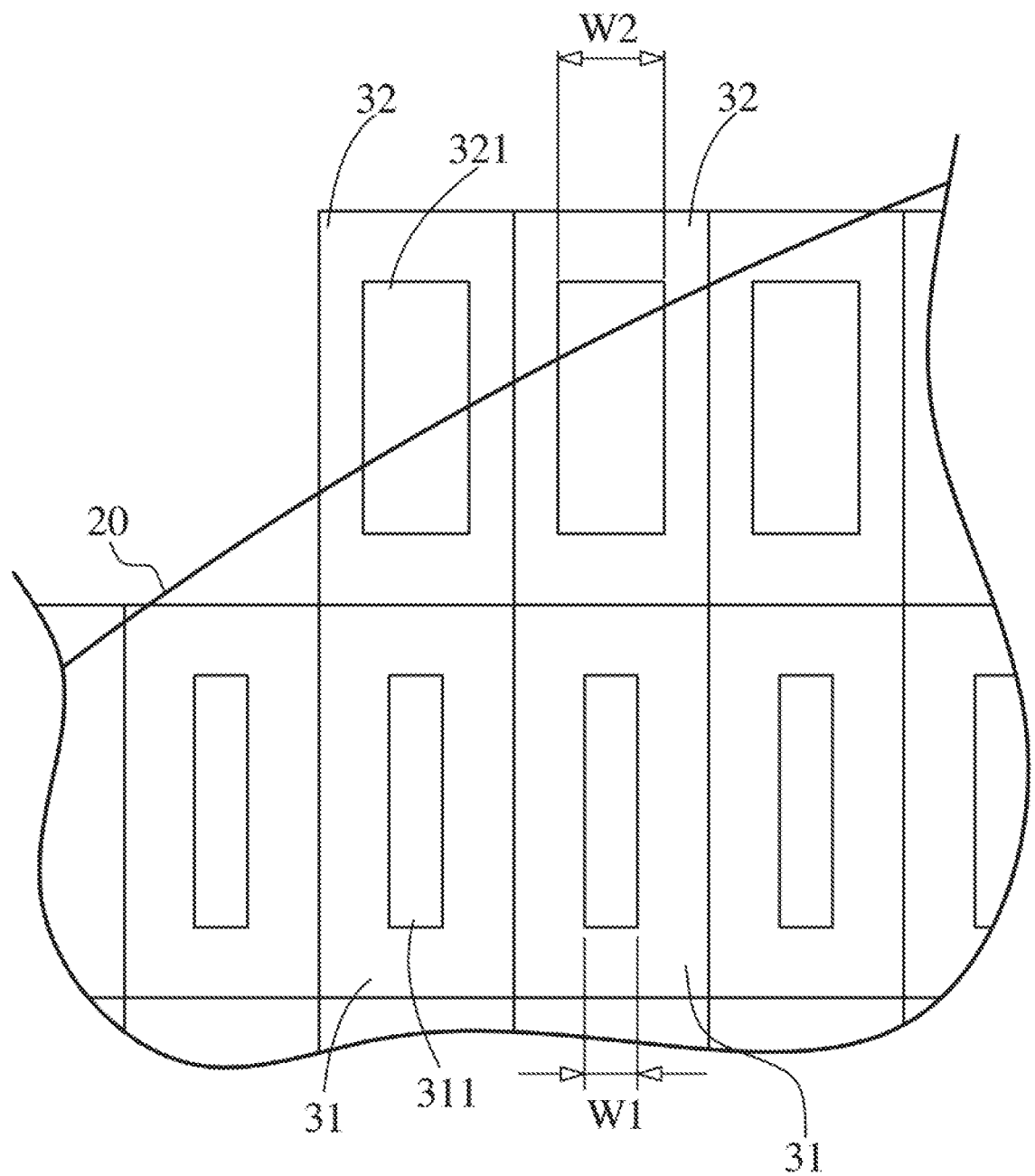
FIG. 3 is a partial enlarged view of the non-rectangular display panel of FIG. 2.

With reference to FIG. 3, which shows a partial enlarged view of an area A in the non-rectangular display panel described in FIG. 2. The first pixel 31 includes a first pixel electrode 311, and the second pixel 32 includes a second pixel electrode 321. The first pixel electrode 311 has a first width W1, and the second pixel electrode 321 has a second width W2, wherein the first width W1 is less than the second width W2. In this embodiment, the second pixel 32 on the effective display area boundary 20 has a wider pixel electrode, and a range of an electric field effect generated by the wider pixel electrode and a common electrode is reduced, so a deflection degree of a liquid crystal will be reduced accordingly, thereby reducing a light penetration rate in the second pixel, making the brightness of the pixel reduced, and achieving an effect of optimizing the jagged sensation of the effective display area boundary.

Figure 4:
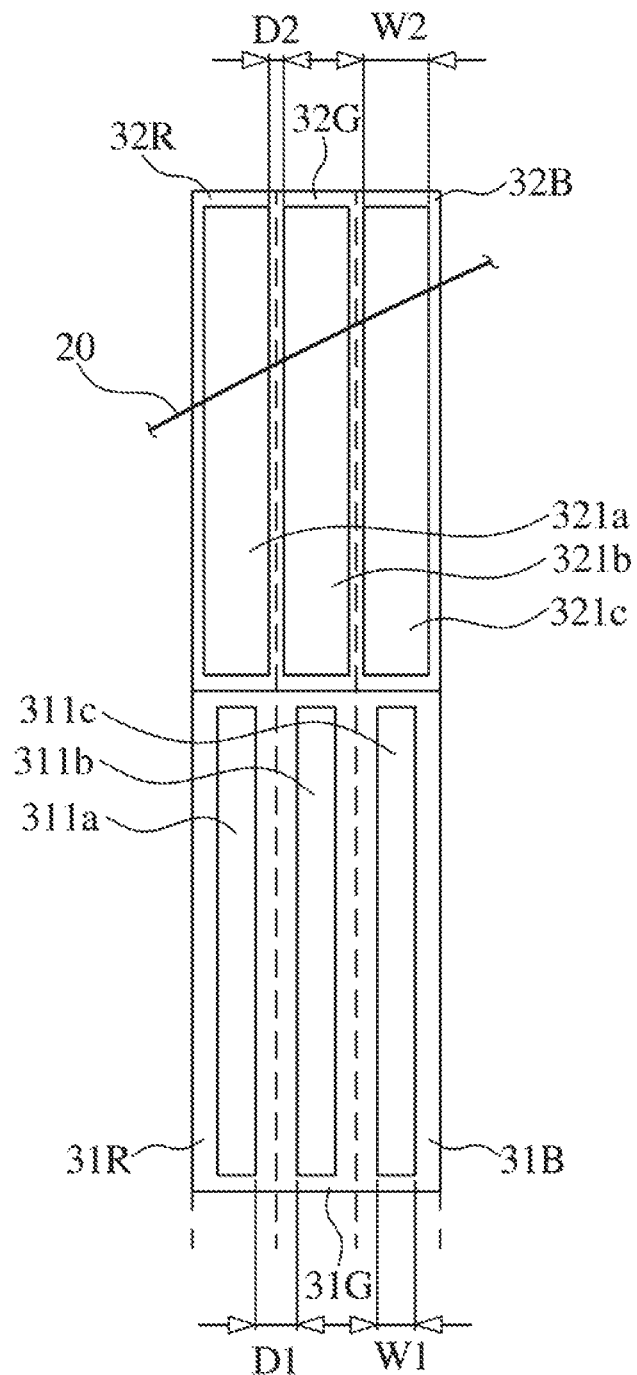
FIG. 4 is a schematic view of a pixel with three sub-pixel electrodes located at an effective display area boundary in the non-rectangular display panel according to the embodiment of the present disclosure.

With reference to FIG. 4, in another embodiment of the present disclosure, the first pixel 31 may include three first sub-pixels, such as a first R sub-pixel 31R, a first G sub-pixel 31G, and a first B sub-pixel 31B, respectively. The second pixel 32 may include three second sub-pixels, which are a second R sub-pixel 32R, a second G sub-pixel 32G, and a second B sub-pixel 32B, respectively. The first pixel electrode 311 includes at least three first sub-pixel electrodes 311a, 311b, and 311c, and the second pixel electrode includes at least three second sub-pixel electrodes 312a, 312b, and 312c. The three first sub-pixel electrodes 311a, 311b, and 311c correspond to the first R sub-pixel 31R, the first G sub-pixel 31G and the first B sub-pixel 31B, respectively. The three second sub-pixel electrodes 312a, 312b, and 312c correspond to the second R sub-pixel 32R, the second G sub-pixel 32G, and the second B sub-pixel 32B, respectively.

Preferably, the three first sub-pixel electrodes 311a, 311b, and 311c have a same first width W1, respectively, and the three second sub-pixel electrodes 312a, 312b, and 312c have a same second width W1, respectively, wherein the W1 is less than the W2. A first distance D1 between any two of the first sub-pixel electrodes 311a, 311b, and 311c adjacent to each other is same and a second distance D2 between any two of the second sub-pixel electrodes 312a, 312b, and 312c adjacent to each other is same too. Through a design of such sub-pixel electrodes, the second sub-pixel electrodes included in the second pixel 32 on the effective display area boundary 20 have a wider electrode and a narrower spacing between them. A range of an electric field effect generated by the wider electrode and a common electrode is reduced, so a deflection degree of a liquid crystal will be reduced accordingly, thereby reducing a light penetration rate in the second pixel, making brightness of the pixel reduced, and achieving an effect of optimizing the jagged sensation of the effective display area boundary.

The present disclosure has been disclosed in the above related embodiments, but the above embodiments are merely examples for implementing the present disclosure. It must be noted that the disclosed embodiments do not limit the scope of the present disclosure. On the contrary, modifications and equalization included in the spirit and scope of the claims are included within the scope of the present invention.

What is claimed is:

1. A non-rectangular display panel, comprising:
a plurality of pixels comprising a first pixel and a second pixel, wherein the first pixel has at least three first sub-pixels, the second pixel has at least three second sub-pixels, the first pixel has a first pixel electrode, the second pixel has a second pixel electrode, the first pixel electrode comprises at least three first sub-pixel electrodes, the second pixel electrode comprises at least three second sub-pixel electrodes, and a first distance between two of the first sub-pixel electrodes adjacent to each other is greater than a second distance between two of the second sub-pixel electrodes adjacent to each other;

an effective display area within which the first pixel is distributed; and an effective display area boundary located outside the effective display area and is non-rectangular, wherein the second pixel is distributed on the effective display area boundary;

wherein a width of the first pixel electrode is less than a width of the second electrode.

2. The non-rectangular display panel according to claim 1, wherein the first distance between two of the first sub-pixel electrodes adjacent to each other is same.

3. The non-rectangular display panel according to claim 1, wherein the second distance between two of the second sub-pixel electrodes adjacent to each other is same.

4. A non-rectangular display panel, comprising:

a plurality of pixels comprising a first pixel and a second pixel, wherein the first pixel has a first pixel electrode, the second pixel has a second pixel electrode, the first pixel electrode comprises at least three first sub-pixel electrodes, the second pixel electrode comprises at least three second sub-pixel electrodes, and a first distance between two of the first sub-pixel electrodes adjacent to each other is greater than a second distance between two of the second sub-pixel electrodes adjacent to each other;

an effective display area within which the first pixel is distributed; and an effective display area boundary which is located outside the effective display area and is non-rectangular, wherein the second pixel is distributed on the effective display area boundary;

wherein a width of the first pixel electrode is less than a width of the second electrode.

5. The non-rectangular display panel according to claim 4, wherein the first distance between two of the first sub-pixel electrodes adjacent to each other is same.

6. The non-rectangular display panel according to claim 4, wherein the second distance between two of the second sub-pixel electrodes adjacent to each other is same.

7. A liquid crystal display device, comprising a non-rectangular display panel, wherein the non-rectangular display panel comprises:

a plurality of pixels comprising a first pixel and a second pixel, wherein the first pixel has a first pixel electrode, the second pixel has a second pixel electrode, wherein the first pixel electrode comprises at least three first sub-pixel electrodes, the second pixel electrode comprises at least three second sub-pixel electrodes, and a first distance between two of the first sub-pixel electrodes adjacent to each other is greater than a second distance between two of the second sub-pixel electrodes adjacent to each other;

an effective display area within which the first pixel is distributed; and an effective display area boundary which is located outside the effective display area and is non-rectangular, wherein the second pixel is distributed on the effective display area boundary;

wherein a width of the first pixel electrode is less than a width of the second electrode.

8. The liquid crystal display device according to claim 7, wherein the first pixel comprises at least three first sub-pixels, and the second pixel comprises at least three second sub-pixels.

9. The liquid crystal display device according to claim 7, wherein the first distance between two of the first sub-pixel electrodes adjacent to each other is same.

10. The liquid crystal display device according to claim 7, wherein the second distance between two of the second sub-pixel electrodes adjacent to each other is same.

* * * * *